United States Patent
Nakao et al.

(10) Patent No.: US 7,264,306 B2
(45) Date of Patent: Sep. 4, 2007

(54) METAL SCUFF PLATE

(75) Inventors: Makoto Nakao, Chiryu (JP); Satoshi Kawaguchi, Takaoka (JP); Jin Shinmura, Toyama (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 20 days.

(21) Appl. No.: 11/088,864

(22) Filed: Mar. 25, 2005

(65) Prior Publication Data

US 2005/0229514 A1    Oct. 20, 2005

(30) Foreign Application Priority Data

Mar. 25, 2004  (JP) ............... 2004-088520

(51) Int. Cl.
   *B60R 27/00*  (2006.01)
(52) U.S. Cl. .................................... 296/199
(58) Field of Classification Search ............... 296/199; 280/850
   See application file for complete search history.

(56) References Cited

U.S. PATENT DOCUMENTS

| | | | |
|---|---|---|---|
| 2,358,206 A * | 9/1944 | Boersma | 280/850 |
| 2,590,264 A * | 3/1952 | Meyers et al. | 280/850 |
| 4,355,842 A * | 10/1982 | Hira | 296/199 |
| 4,765,036 A | 8/1988 | Iguchi et al. | |
| 5,520,765 A | 5/1996 | Zoller | |
| 5,795,118 A | 8/1998 | Osada | |
| 6,062,633 A * | 5/2000 | Serizawa | 296/199 |
| 2002/0139081 A1 | 10/2002 | Nada et al. | |

FOREIGN PATENT DOCUMENTS

| | | |
|---|---|---|
| EP | 0 971 135 A1 | 1/2000 |
| JP | 2001-347898 | 12/2001 |
| JP | 2002-046529 | 2/2002 |
| JP | 2003-063320 | 3/2003 |

\* cited by examiner

*Primary Examiner*—Lori L. Lyjak
(74) *Attorney, Agent, or Firm*—Finnegan, Henderson, Farabow, Garrett & Dunner, L.L.P.

(57) ABSTRACT

A metal scuff plate includes a plate made from a light-alloy and having a back side, at least one pin positioned at a portion of the back side of the plate and welded thereto. The at least one pin possesses an engagement groove. The metal scuff plate further includes a synthetic-resin made clip having at least one first hook engaged with the engagement groove of the pin. The clip is engaged with at least one engagement hole defined at a body so as to fasten the light-alloy plate to the body.

18 Claims, 7 Drawing Sheets

METAL SCUFF PLATE

CROSS REFERENCE TO RELATED APPLICATIONS

This application is based on and claims priority under 35 U.S.C. §119 with respect to Japanese Patent Application 2004-088520, filed on Mar. 25, 2004, the entire content of which is incorporated herein by reference.

FIELD OF THE INVENTION

This invention generally relates to a metal scuff plate attached to a vehicle body such as a rocker panel of a vehicle.

BACKGROUND

It is conventionally believed that adhesive agents, or two-sided tapes, could be applied in order to attach a metal scuff plate to a rocker panel. However, because of unfavorable characteristics such as a low degree of precision in adhesion, and complications in the handling of papers that needs to be discarded, adhering materials such as adhesive agents and two-sided tapes have not been widely employed.

As a substitute for these adhering materials, recent developments have led to a method of fastening a metal scuff plate to a vehicle door or to a vehicle body. According to this method, a metal scuff plate and a clip are mounted on a resin-made garnish, and the clip is engaged to a fastening hole of the vehicle door, or of the vehicle body, thus enabling the metal scuff plate to be fastened to the vehicle door, or to the vehicle body. This method, or similar methods, has been disclosed respectively in JP2003-63320A, on which US2002-139081A1 is based, and from which US2002-139081A1 claims priority, in JP2002-46529A, and in JP2001-347898A.

In the aforementioned method of fastening a metal scuff plate to a vehicle door, or to a vehicle body, a synthetic-resin made garnish is needed for a metal scuff plate. Therefore, manufacturers are required to fixedly mount a scuff plate on a garnish. Moreover, in order to attain a stable support of a clip by a garnish, it is necessary to provide a garnish, which possess a sufficient degree of strength for supporting a clip. Namely, a garnish on occasions is required to have a sufficient thickness for supporting a clip. In such a case, there may be a danger of limiting a freedom degree of designing.

In view of the above circumstances, the present invention has been made so as to improve the above-disclosed matters.

SUMMARY OF THE INVENTION

According to an aspect of the present invention, a metal scuff plate includes a plate made from a light-alloy and having a back side, at least one pin positioned at a portion of the back side of the plate and welded thereto. The at least one pin possessing an engagement groove. The metal scuff plate further includes a synthetic-resin made clip having at least one first hook engaged with the engagement groove of the pin. The clip is engaged with at least one engagement hole defined at a body so as to fasten the light-alloy plate to the body.

It is preferable that the metal scuff plate further includes the synthetic-resin made clip having at least one second hook engaged with the engagement hole and a back side of the body. Both the light-alloy plate and the at least one pin are made from an aluminum alloy.

It is further preferable that the at least one pin includes a cylindrical portion and the engagement groove adjacent to the cylindrical portion, and at least one of the cylindrical portion and the engagement groove is provided with at least one of at least one flat surface and at least one serrated portion.

It is still further preferable that the at least one engagement hole is at least one of a datum hole, of which a diameter corresponds to a major diameter of the clip, a clearance hole, of which a diameter is longer than the major diameter of the clip, and a slotted hole, of which a first diameter corresponds to the major diameter of the clip, and of which a second diameter is longer than the major diameter of the clip.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described in detail below with reference to the accompanying drawings.

Figure 1:
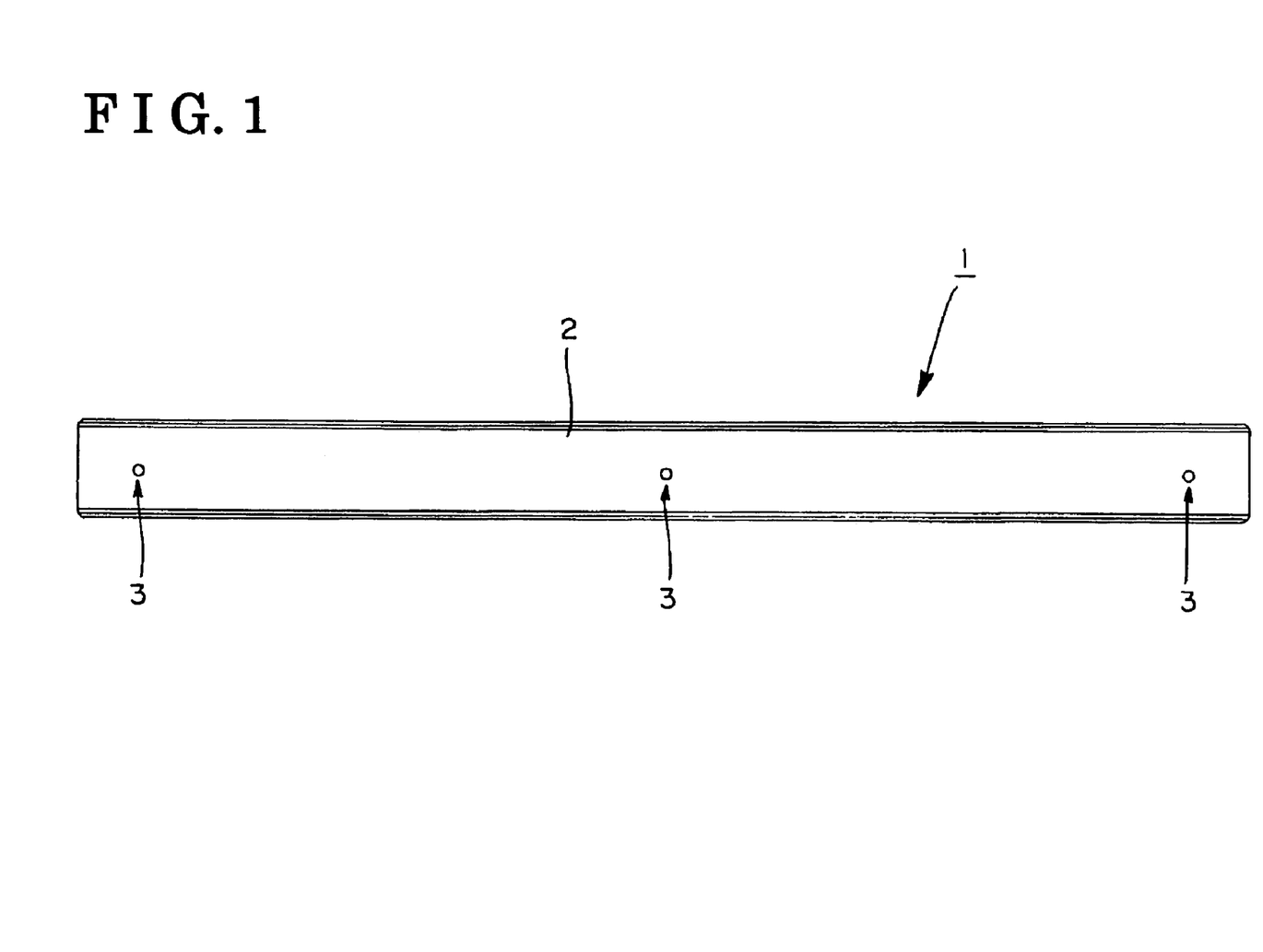
FIG. 1 is a plane view illustrating a metal scuff plate according to an embodiment of the present invention.
Figure 2:
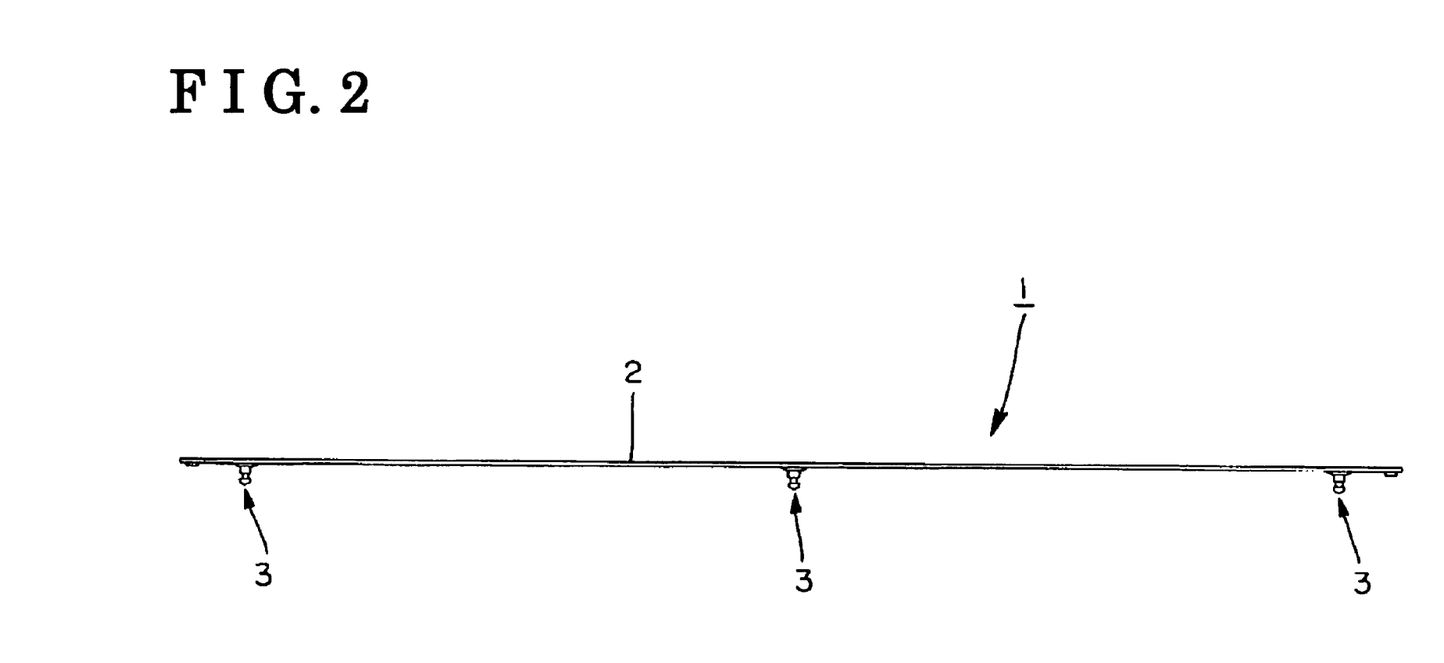
FIG. 2 is a front view illustrating the metal scuff plate illustrated in FIG. 1.
Figure 3:
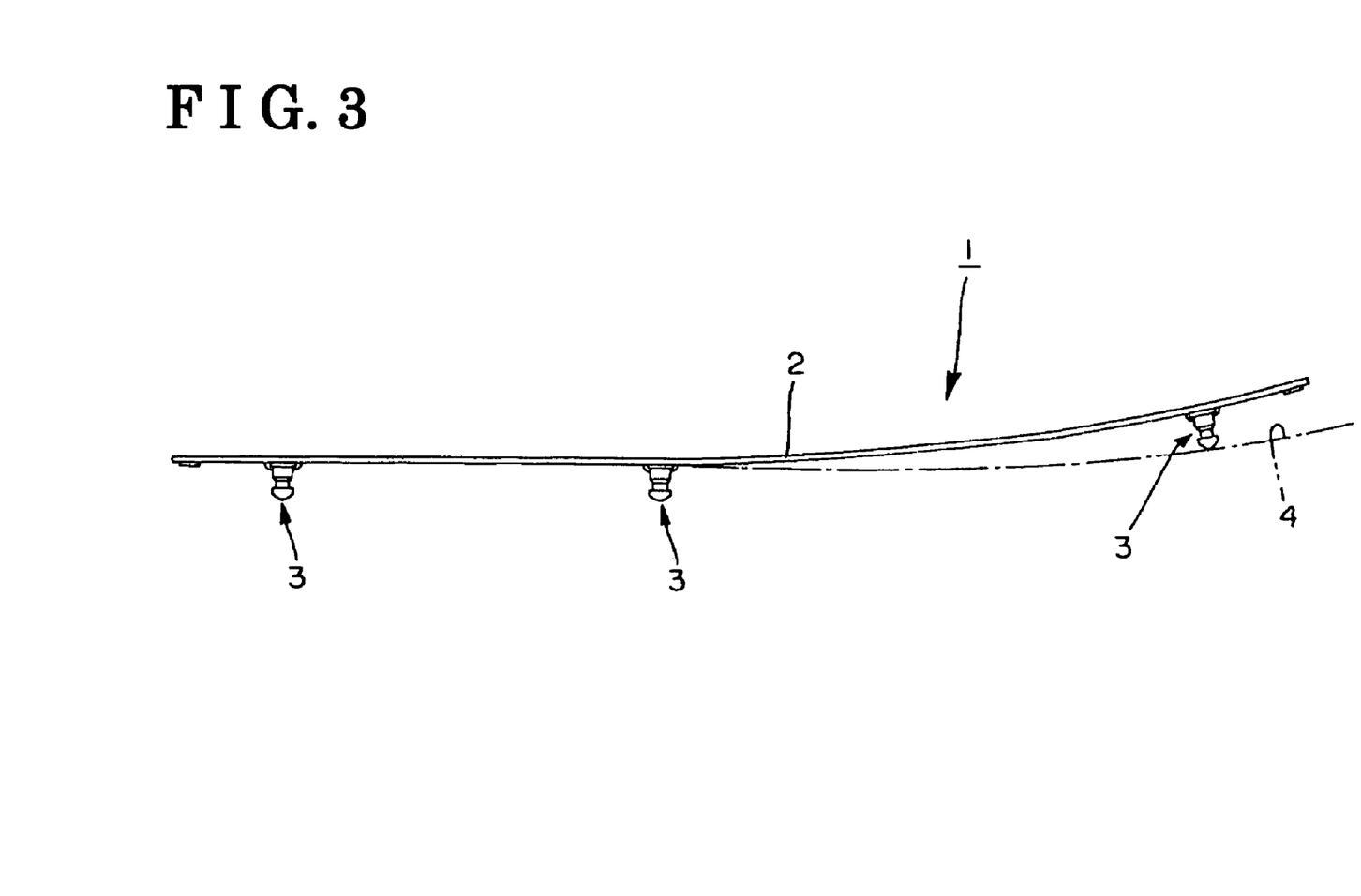
FIG. 3 is a front view for illustrating an example of a state where one end of the metal scuff plate is curved along a body.

As is apparent from FIGS. 1, 2 and 3, a metal scuff plate 1 according to the embodiment of the present invention incorporates a light-alloy (e.g., a 6000 series aluminum-alloy) plate 2 and three pins 3 which have been stud welded at a surface of the plate 2 opposite to a design surface thereof. According to the embodiment of the present invention, there are three pins 3 provided at the aluminum-alloy plate 2. These multiple pins 3 are positioned away from each other on the aluminum-alloy plate 2. Instead, the number of pins can be set to another value such as 1, 2, 4 and so on. Each pin 3 is processed, by means of header processing, from a 5000 series aluminum-alloy. FIGS. 8, 9, 10 and 11 respectively illustrate a structure of the pin 3.

As shown in FIG. 3, it is preferable that the plate 2 curve in a longitudinal direction towards on end thereof at a distance substantially corresponding to a height of the pin 3 relative to a vehicle body 4 on which the plate 2 is fixedly to be mounted. In such a circumstance, when the pin 3 at one end of the plate 2 is engaged to a portion of the vehicle body 4, it is not necessary to force the other end of the plate 2 to curve along the vehicle body 4. This arrangement effectively facilitates a fastening operation of the plate 2 onto the vehicle body 4.

Figure 5:
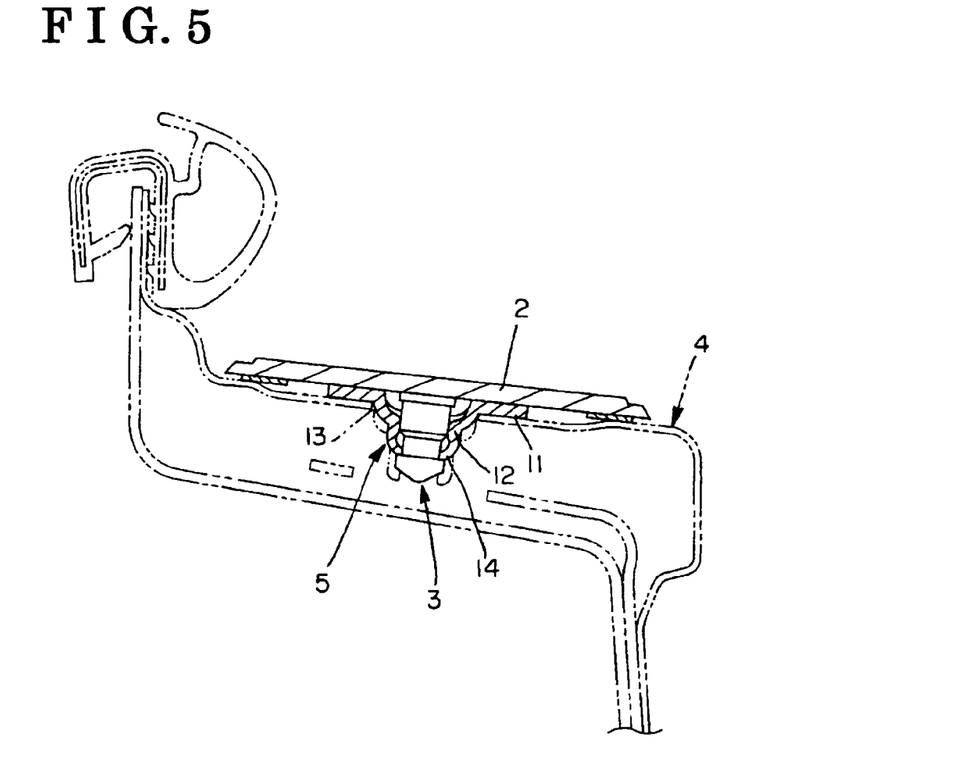
FIG. 5 is a cross sectional view illustrating a fastening example of the scuff plate to the body.
Figure 6:
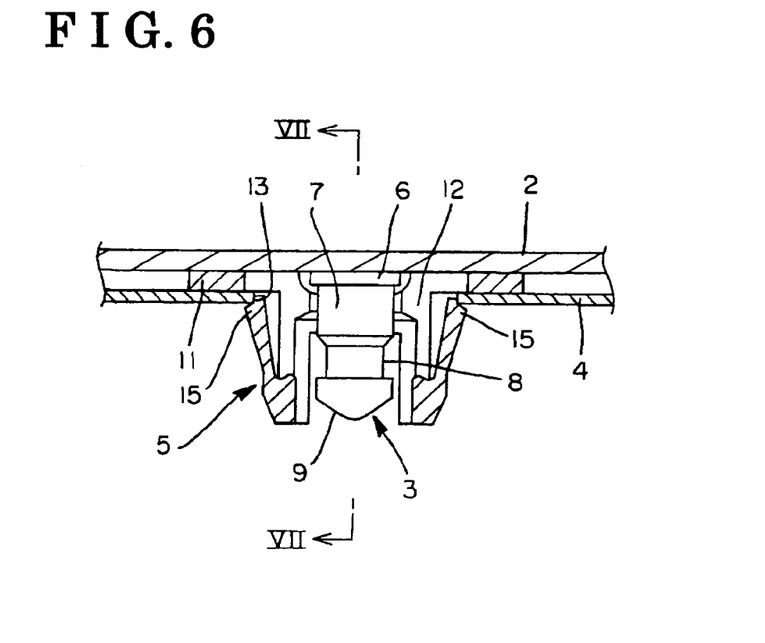
FIG. 6 is a cross sectional view illustrating a fastening example of a clip to the body.
Figure 7:
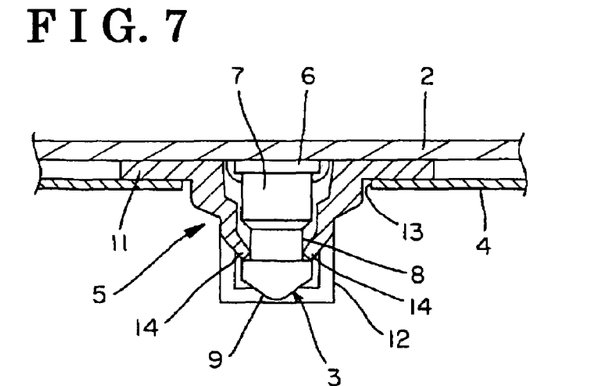
FIG. 7 is a cross sectional view of the metal scuff plate fastened to the body taken along a line VII-VII in FIG. 6.
Figure 8:
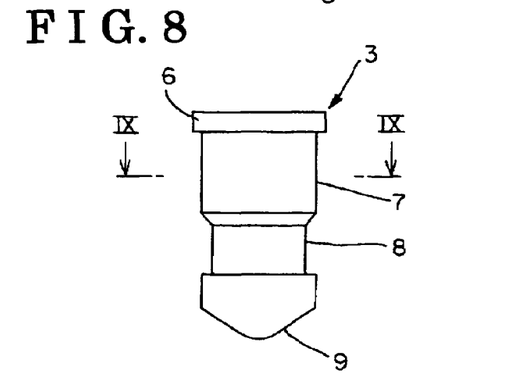
FIG. 8 is a front view illustrating an example of a pin according to the embodiment of the present invention.
Figure 9:
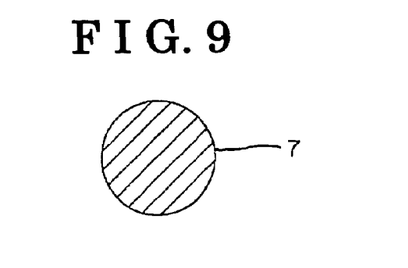
FIG. 9 is a sectional view illustrating the pin taken along a line IX-IX in FIG. 8.
Figure 10:
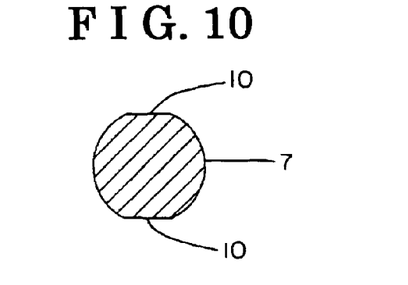
FIG. 10 is a sectional view illustrating another example of the pin illustrated in FIG. 8.
Figure 11:
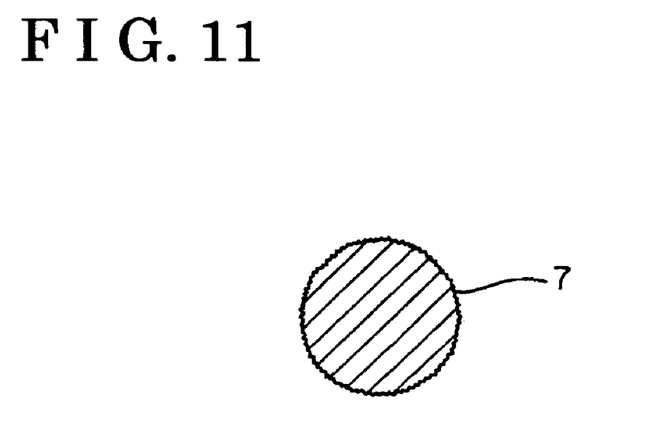
FIG. 11 is a sectional view illustrating still another example of the pin illustrated in FIG. 8.
Figure 12:
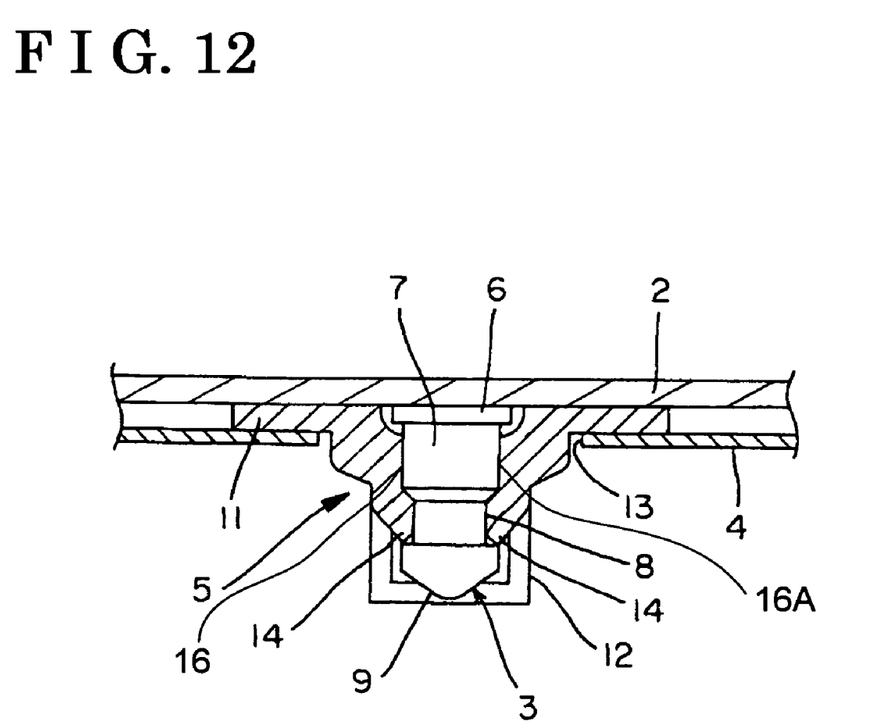
FIG. 12 is a cross sectional view of the metal scuff plate having a pin and a clip, each of which possesses a serrated portion.

As is obvious from FIGS. 5, 6 and 7, a synthetic-resin made clip 5 is attached to each pin 3. As is shown in FIGS. 8 and 9, each pin 3 is formed integrally with a flange portion 6 (i.e., an attachment portion) that is stud welded to the plate 2, a substantially cylindrically shaped portion 7 (i.e., a cylindrical portion) connected, or adjacent, to the flange portion 6, an engagement groove 8 connected, or adjacent, to the cylindrical portion 7, and a chevron insert portion 9 integrally provided at one end of each pin 3. The cylindrical portion 7 can possess a substantially perfect circle-shaped cross-section, as is illustrated in FIG. 9. However, the cross-sectional shape of the cylindrical portion 7 is not limited to the above, and the cylindrical portion 7 can possess a substantially circle-shaped cross section with opposing flat surfaces 10, as is illustrated in FIG. 10. When the cylindrical portion 7 possesses a substantially circle-shaped cross section with opposing flat surfaces 10, orientation of a portion of the clip 5 along the flat surfaces 10 results in the clip 5 being oriented in a fixed direction relative to the pin 3. An identical effect can be provided even when the cylindrical portion 7 possesses a single flat surface 10 in substitute for the opposing flat surfaces 10. As is apparent from FIGS. 11 and 12, an outer surface of the cylindrical portion 7 and an inner surface of the clip 5 can be both processed to have at least one serrated portion, serrated portions 16 and 16A respectively. In such a case, the clip 5 can be effectively prevented from revolving about the pin 3. Further, by press-fitting the resin made clip 5 without serrated portions into the pin 3 of which the outer surface of the cylindrical portion 7 is formed with serrated portions, it is possible to provide a component, which is configured with the pin 3 and the clip 5, with an improved durability. According to the embodiment of the present invention, the flat surfaces 10 and the serrations are respectively provided at the cylindrical portion 7 of each pin 3. Alternatively, even when the flat surfaces 10 and the serrations are respectively provided at an outer peripheral surface of the engagement groove 8, the clip 5 can be effectively prevented from revolving about the pin 3, and can be oriented in a fixed direction relative to the pin 3.

As is apparent from FIGS. 5, 6 and 7, the clip 5 for each pin 3 is provided with a flange portion 11 (i.e., an attachment portion 11) positioned between the plate 2 and the body 4, and a pillar portion 12 connected, or adjacent, to the flange portion 11. The pillar portion 12 is fitted into an attachment hole 13 (i.e., an engagement hole 13) of the body 4. According to the embodiment of the present invention, because there are three pins 3 provided at the plate 2, there are three attachment holes 13 defined at the body 4. The pillar portion 12 is structured with a pair of wall portions, which face each other, and each of which possesses a substantially arc-shaped outer surface. Each of a pair of second hooks 15 is integrally provided at each of the pair of wall portions, and, as can be seen in FIG. 6, is projected radially and outwardly in an upward direction in FIG. 5. A pair of first hooks 14 is integrally provided between these two wall portions of the pillar portion 12, and, as can be seen in FIG. 7, extends radially and inwardly in a lower direction in FIG. 7. According to the embodiment of the present invention, hooks 14 and 15 respectively form pairs, but each of hooks 14 and 15 can also exists as a single unit.

The clip 5 is formed integrally with the pair of first hooks 14 which can be engaged with the engagement groove 8 of each pin 3, and the pair of second hooks 15 that comes in contact with a back side of the vehicle body 4.

When the clip 5 is fitted into each pin 3, the pair of first hooks 14 is engaged with the engagement groove 8 of each pin 3. Therefore, it is possible to prevent the clip 5 from dropping out of each pin 3. As described above, when the pin 3, to which the clip 5 has been attached, is inserted into the fastening hole 13 of the body 4, the pair of second hooks 15 is engaged at the back side of the body 4, and the flange portion 11 is positioned along a surface of the body 4, whereby the body 4 is held tightly between the flange portion 11 and the pair of second hooks 15. Therefore, it is possible to hold the plate 2 securely at the body 4.

Figure 4:
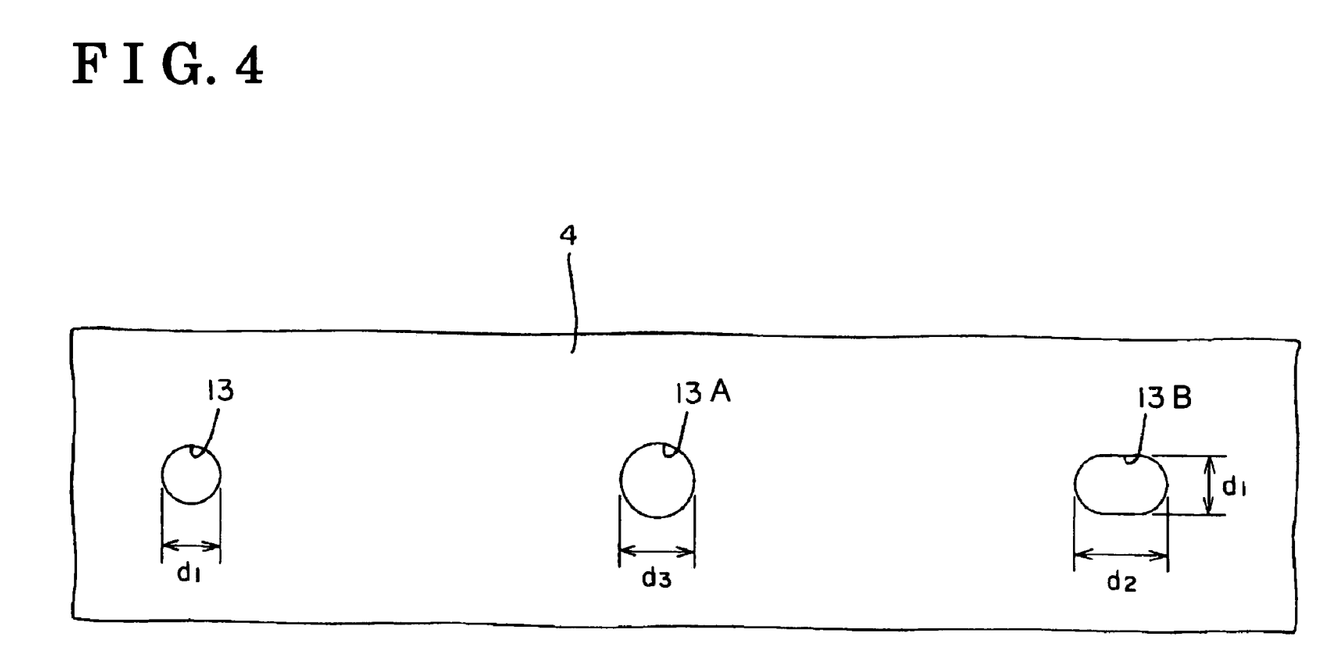
FIG. 4 is a plane view illustrating preferable examples of an engagement hole defined at the body.

FIG. 4 exemplifies shapes of the attachment holes 13 defined in the body 4 according to the embodiment of the present invention. The attachment hole 13 illustrated at the left-side in FIG. 4 is referred to as a datum hole 13, the attachment hole 13B illustrated at the right-side in FIG. 4 is referred to as a slotted hole 13B, and the attachment hole 13A illustrated at the center in FIG. 4 is referred to as a clearance hole 13A. The datum hole 13 is designed to possess a diameter $d_1$ that substantially corresponds to a major diameter of the pillar portion 12 of the clip 5, the slotted bore 13B is designed to possess a first diameter $d_1$, which substantially corresponds to the major diameter of the pillar portion 12 of the clip 5, and a second diameter $d_2$, which is longer than the diameter $d_1$, and the clearance hole 13A is designed to possess a diameter $d_3$ that is longer than the diameter $d_1$, and that is shorter than the diameter $d_2$. In this case, the major diameter of the pillar portion 12 of the clip 5 is represented by a diameter at about vertically central portions of the arc-shaped outer surfaces of the pair of wall portions.

In terms of mounting the plate 2 on the body 4, it is preferable that the datum hole 13, the clearance hole 13A and the slotted hole 13B be sequentially aligned in that order. When the plate 2 is to be mounted on the body 4, the clip 5 to which the pin 3 is attached is inserted first into the datum hole 13. The rest of the clips 5 are then sequentially inserted into the clearance hole 13A and the slotted hole 13B. In this case, the clearance hole 13A and the slotted hole 13B can effectively absorb dimensional errors of the pins 3 relative to the plate 2, and dimensional errors of the attachment holes 13, 13A and 13B. Consequently, it is possible to fasten the plate 2 at a predetermined position on the body 4.

Moreover, when one of the clips 5 is engaged with the datum hole 13 of the body 4, a portion of the plate 2 facing the attachment hole 13B, the attachment hole 13B which is positioned most away from the datum hole 13, is lifted up from the body 4. According to the embodiment of the present invention, each of these three attachment holes 13 possesses a unique diameter of its own. Alternatively, these three attachment holes 13 can all possess an identical diameter.

According to the embodiment of the present invention, the clips 5, to which the pins already have respectively been attached, are fitted into the attachment holes 13 of the body 4. Alternatively, the clips 5 can be fastened at the vehicle body 4 prior to the pins 3 being attached, and in this case, the pins 3 can be later attached to the clips 5 after the clips 5 have already been fastened at the body 4.

As described above, according to the embodiment of the present invention, a method is employed, by which a pin welded to a light-alloy plate is attached to a clip, and the clip is fitted into an engagement hole of a body. In this case, the pin has been welded to the plate. Therefore, there is no worry about a thickness of a plate to which a clip is attached. Namely, it is possible to increase a freedom degree of designing a plate. Moreover, it is possible to take out, or to erase, by means of a hairline processing method applied to a design surface of a plate, welded remains on the design surface of the plate, thereby avoiding a spoiled appearance of the plate.

Further, as described above, according to the embodiment of the present invention, because the pin 3 is welded to the plate 2, it is possible to achieve a high degree of attaching strength of the clip 5 to the pin 3, i.e., to the plate 2. Therefore, there is no need to worry about a looseness of the scuff plate 1 relative to the body 4, and about a drop of the scuff plate from the body 4.

Moreover, after first fitting the clip 5 into the datum hole 13 of the body 3, it is possible to sequentially fit the other clips 5 into the adjacent clearance hole 13A, and/or, into the adjacent slotted hole 13B. Consequently, it is possible to readily position, by means of this fitting operation, the scuff plate 1 at an appropriate portion of the body 4.

Moreover, a relative position between the pin 3 and the clip 5 can be assured to be accurate, by providing a flat surface or a serrated portion at a portion of the pin 3 which comes in contact with the first hook 14.

The principles, the preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A metal scuff plate comprising:
a plate made from a light-alloy and having a back side;
at least one pin positioned at a portion of the back side of the plate and stud-welded thereto, the at least one pin possessing an engagement groove; and
a synthetic-resin made clip engaged with at least one engagement hole defined at a body so as to fasten the light-alloy plate to the body,
the synthetic-resin made clip having:
a pillar portion fitted into the engagement hole of the body and having a first wall and a second wall facing each other, each wall possessing an arc-shaped outer surface;
at least one first hook engaged with the engagement groove of the pin and having a pair of first hooks provided between the first and second walls of the pillar portion and extending inwardly in a radial manner; and
at least one second hook engaged with a back side of the body and having a pair of second hooks provided at the first and second walls and extending outwardly in a radial manner;
wherein both the light-alloy plate and the pin are made from an aluminum alloy.

2. The metal scuff plate according to claim 1, wherein the at least one pin includes a cylindrical portion and the engagement groove adjacent to the cylindrical portion, and wherein at least one of the cylindrical portion and the engagement groove is provided with at least one of at least one flat surface and at least one serrated portion.

3. The metal scuff plate according to claim 2, wherein the at least one engagement hole is at least one of a datum hole, of which a diameter corresponds to a major diameter of the clip, a clearance hole, of which a diameter is longer than the major diameter of the clip, and a slotted hole, of which a first diameter corresponds to the major diameter of the clip, and of which a second diameter is longer than the major diameter of the clip.

4. The metal scuff plate according to claim 1, wherein the at least one pin includes an attachment portion, a cylindrical portion adjacent to the attachment portion, the engagement groove adjacent to the cylindrical portion, and an insert portion adjacent to the engagement groove, and wherein the attachment portion is welded to the light-alloy plate.

5. The metal scuff plate according to claim 1, wherein the clip is engaged with the body in a condition where the clip has already been attached to the at least one pin.

6. The metal scuff plate according to claim 1, wherein the at least one pin is attached to the clip which has already been engaged with the body.

7. The metal scuff plate according to claim 1, wherein the at least one pin is three pins, and the at least one engagement hole is three engagement holes, and wherein the three engagement holes include at least one of a datum hole, of which a diameter corresponds to a major diameter of the clip, a clearance hole, of which a diameter is longer than the major diameter of the clip, and a slotted hole, of which a first diameter corresponds to the major diameter of the clip, and of which a second diameter is longer than the major diameter of the clip.

8. The metal scuff plate according to claim 2, wherein the at least one flat surface is a pair of flat surfaces that face each other.

9. A metal scuff plate comprising:
a plate made from a light-alloy and having a back side;
plural pins positioned at a portion of the back side of the plate and stud-welded thereto, the plural pins possessing engagement grooves respectively; and
plural synthetic-resin made clips, each of which has at least one first hook engaged with the engagement groove of the each pin, the plural clips engaged with plural engagement holes defined at a body so as to fasten the light-alloy plate to the body,
wherein the plural pins comprise at least three pins, and the plural engagement holes comprise at least three engagement holes, including at least one of a datum hole, of which a diameter corresponds to a major diameter of the each clip, a clearance hole, of which a diameter is longer than the major diameter of the each clip, and a slotted hole, of which a first diameter corresponds to the major diameter of the each clip, and of which a second diameter is longer than the major diameter of the each clip, wherein the plate curves upwardly approaching one end of the plate in a longitudinal direction and an upwardly curving amount corresponds to a height of the pins.

10. The metal scuff plate according to claim 9, further comprising:
the plural synthetic-resin made clips, each of which has at least one second hook engaged with the each engagement hole and a back side of the body,
wherein both the light-alloy plate and the plural pins are made from an aluminum alloy.

11. The metal scuff plate according to claim 10, wherein the each pin includes a cylindrical portion and the engagement groove adjacent to the cylindrical portion, and wherein at least one of the cylindrical portion and the engagement groove is provided with at least one of at least one flat surface and at least one serrated portion.

12. The metal scuff plate according to claim 10, wherein the each pin includes an attachment portion, a cylindrical portion adjacent to the attachment portion, the engagement groove adjacent to the cylindrical portion, and an insert portion adjacent to the engagement groove, and wherein the attachment portion is welded to the light-alloy plate.

13. The metal scuff plate according to claim 10, wherein the each clip is engaged with the body in a condition where the each clip has already been attached to the each pin.

14. The metal scuff plate according to claim 10, wherein the each pin is attached to the each clip that has already been engaged with the body.

15. The metal scuff plate according to claim 10, wherein the at least one first hook is a pair of first hooks, and the at least one second hook is a pair of second hooks.

16. The metal scuff plate according to claim 11, wherein the at least one flat surface is a pair of flat surfaces that face each other.

17. A metal scuff plate according to claim 1, wherein said clip is attached to said at least one pin, said at least one pin and said clip being inserted into said engagement hole.

18. A metal scuff plate comprising:

a plate made from a light-alloy and having a back side;

at least one pin positioned at a portion of the back side of the plate and stud-welded thereto, the at least one pin possessing an engagement groove; and a synthetic-resin made clip engaged with at least one engagement hole defined at a body so as to fasten the light-alloy plate to the body, the synthetic-resin made clip having:

at least one first hook engaged with the engagement groove of the pin; and at least one second hook engaged with a back side of the body;

wherein both the light-alloy plate and the pin are made from an aluminum alloy, and a front surface of the plate is a design surface on which a welding print of the pin welded to the back side of the plate does not appear.

* * * * *